(No Model.)

S. McDONALD.
FEEDING STAND FOR POULTRY.

No. 343,386. Patented June 8, 1886.

WITNESSES:
C. Neveux
C. Sedgwick

INVENTOR:
S. McDonald
BY Munn & Co.
ATTORNEYS.

UNITED STATES PATENT OFFICE.

SAMUEL McDONALD, OF COCHRAN'S MILLS, PENNSYLVANIA.

FEEDING-STAND FOR POULTRY.

SPECIFICATION forming part of Letters Patent No. 343,386, dated June 8, 1886.

Application filed March 11, 1886. Serial No. 194,845. (No model.)

*To all whom it may concern:*

Be it known that I, SAMUEL McDONALD, of Cochran's Mills, in the county of Armstrong and State of Pennsylvania, have invented new and Improved Feeding-Stands for Poultry, of which the following is a specification, reference being had to the annexed drawings, forming a part thereof, in which—

Figure 1:
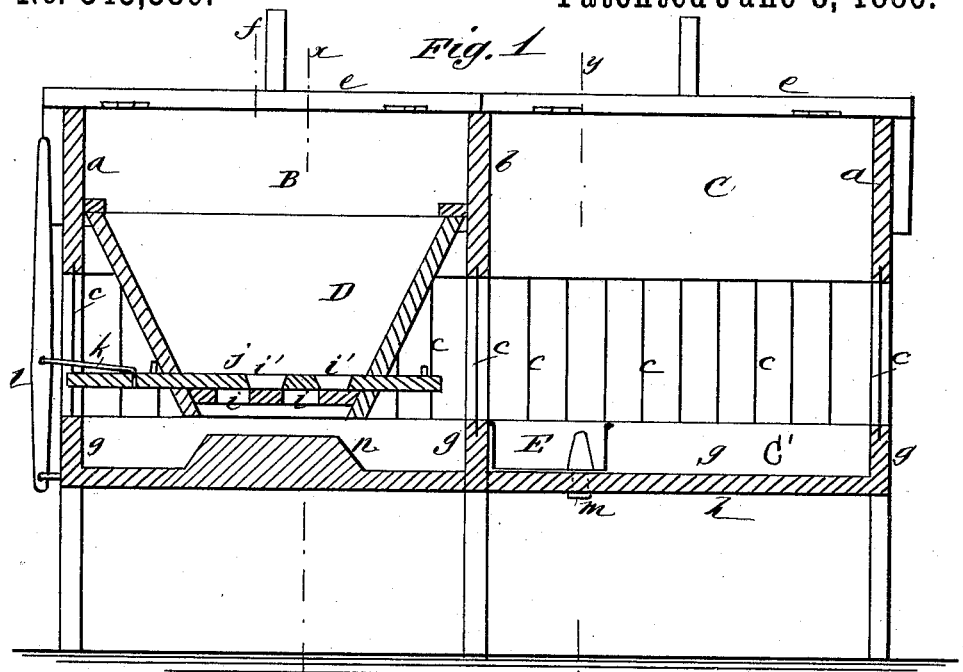
Figure 2:
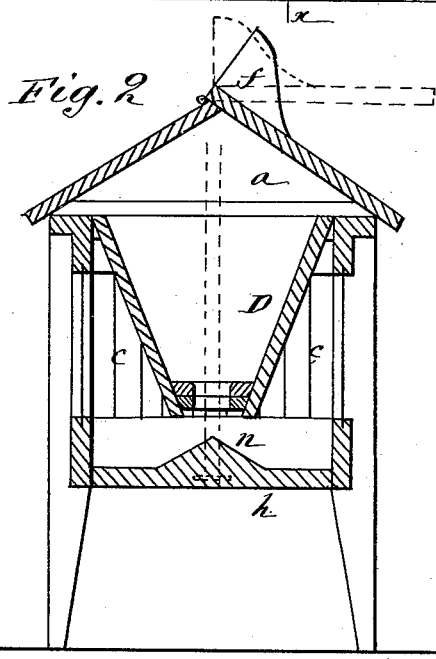
Figure 3:
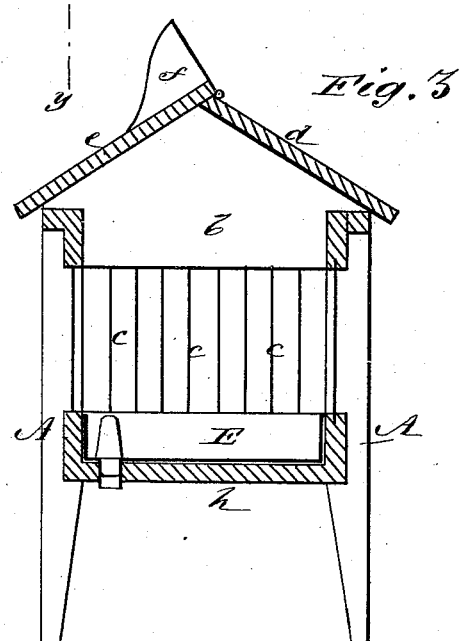

Figure 1 is a vertical longitudinal section of my improved feeding-stand for poultry. Fig. 2 is a vertical transverse section taken on line $x\ x$ in Fig. 1. Fig. 3 is a vertical transverse section taken on line $y\ y$ in Fig. 1.

Similar letters of reference indicate corresponding parts in the different figures of the drawings.

The object of my invention is to provide a stand for feeding poultry, in which the grain is supplied as it is consumed, and which is arranged to prevent the poultry from scattering the food.

My invention consists in the construction and arrangement of parts, as will be hereinafter fully described and claimed.

The body of my improved feeding-stand consists of side frames, A, and the end and center frames, $a\ a\ b$, whose side timbers extend downward and form legs for supporting the body of the stand a short distance above the ground. The side, end, and center frames are provided with series of rods or wires $c$ in their panels, which are separated from each other sufficiently to allow the fowls to gain access to the feed, but arranged so that the space between them will not permit of the entrance of the fowl into the stand. The tops of the frames $a\ a\ b$ are made triangular to receive the roof-boards $d\ e$. The roof-board $d$ is fixed, and the roof-boards $e$, forming the covers of the compartments B C of the stand, are hinged to the edges of the board $d$ and provided with arms $f$, for limiting their motion when opened. The feed-trough is formed of the lower boards, $g$, of the frames $a\ a\ b$ and of the bottom $h$, secured thereto.

In the compartment B is supported a hopper, D, having openings $i$ in the bottom thereof, and provided with a valve, $j$, having openings $i'$, which may be made to coincide with the openings $i$ when it is desired to allow the contents of the hopper D to escape. The end of the valve $j$ is prolonged beyond the end of the hopper, and is connected by a rod, $k$, with the hand-lever $l$, pivoted to the outer side of the frame A. Below the hopper and near the openings $i$ is placed a triangular bar, $n$, beveled at the ends, with its angle opposite the center line of the hopper, for dividing the grain from the hopper into the feed-trough.

In the compartment C is placed a metallic water-trough, E, having a discharge-tube, $m$, extending through the bottom $h$, for emptying the water-trough when desirable. Soft feed is placed in the receptacle C', formed in the bottom of the compartment C, between the water-trough E and the end thereof. The hopper D is filled with grain, and when the valve $j$ is opened the grain flows into the bottom of the compartment B, and is spread evenly on all sides by the triangular bar $n$, and the flow of the grain is checked by the partial filling of the feed-trough at the bottom of the compartment. As the grain is consumed by the fowls, its place is supplied by fresh grain from the hopper D. In this manner a continuous supply of fresh grain is maintained in the trough, and the fowls are prevented from scattering or wasting it.

Having thus fully described my invention, what I claim as new, and desire to secure by Letters Patent, is—

1. A stand for feeding fowls, comprising a frame formed with two compartments having trough-shaped bottoms, barred sides and ends, a hinged cover, a grain-hopper in one compartment, a triangular grain-distributer below the hopper, and a water-receptacle in the trough-shaped bottom of the other compartment, the space in the said trough-shaped bottom beyond the water-receptacle forming a receptacle, C', for soft feed, substantially as set forth.

2. As an improved article of manufacture, a stand for feeding poultry, having two compartments formed of the trough-shaped bottom $h\ g$, barred side and end frames, the fixed roof-board $a$, hinged covers $e$, provided with the arms $f$, the water-receptacle E in the bottom of the compartment C, the space in said bottom beyond the water-receptacle forming a soft-food receptacle, C', the hopper D in the compartment B, provided with apertures $i$ in the bottom thereof, the valves $j$, having apertures $i'$, the connecting-rod $k$, operating-lever $l$, and the triangular grain-distributer $n$, secured to the bottom of the feeding-trough in compartment B below the apertures $i$, substantially as set forth.

SAMUEL McDONALD.

Witnesses:
WILLIAM H. CARNAHAN,
JACOB A. MYERS.